C. A. WRIGHT.
POWER TRANSMITTING MECHANISM FOR TRACTORS.
APPLICATION FILED NOV. 19, 1915.
1,245,168.
Patented Nov. 6, 1917.
3 SHEETS—SHEET 3.
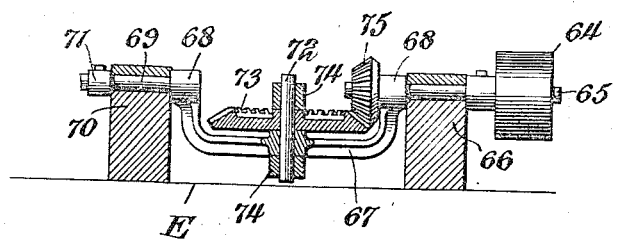
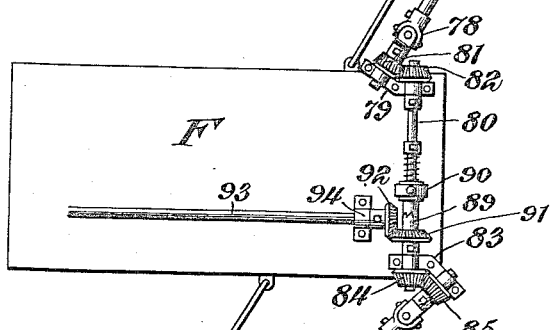
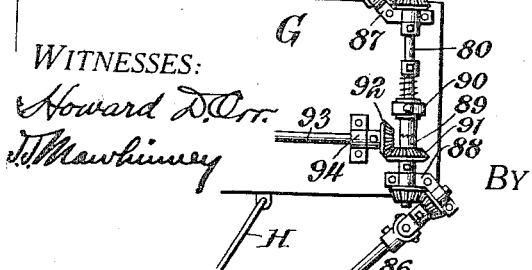
Charles A. Wright,
INVENTOR,
WITNESSES:
Attorney

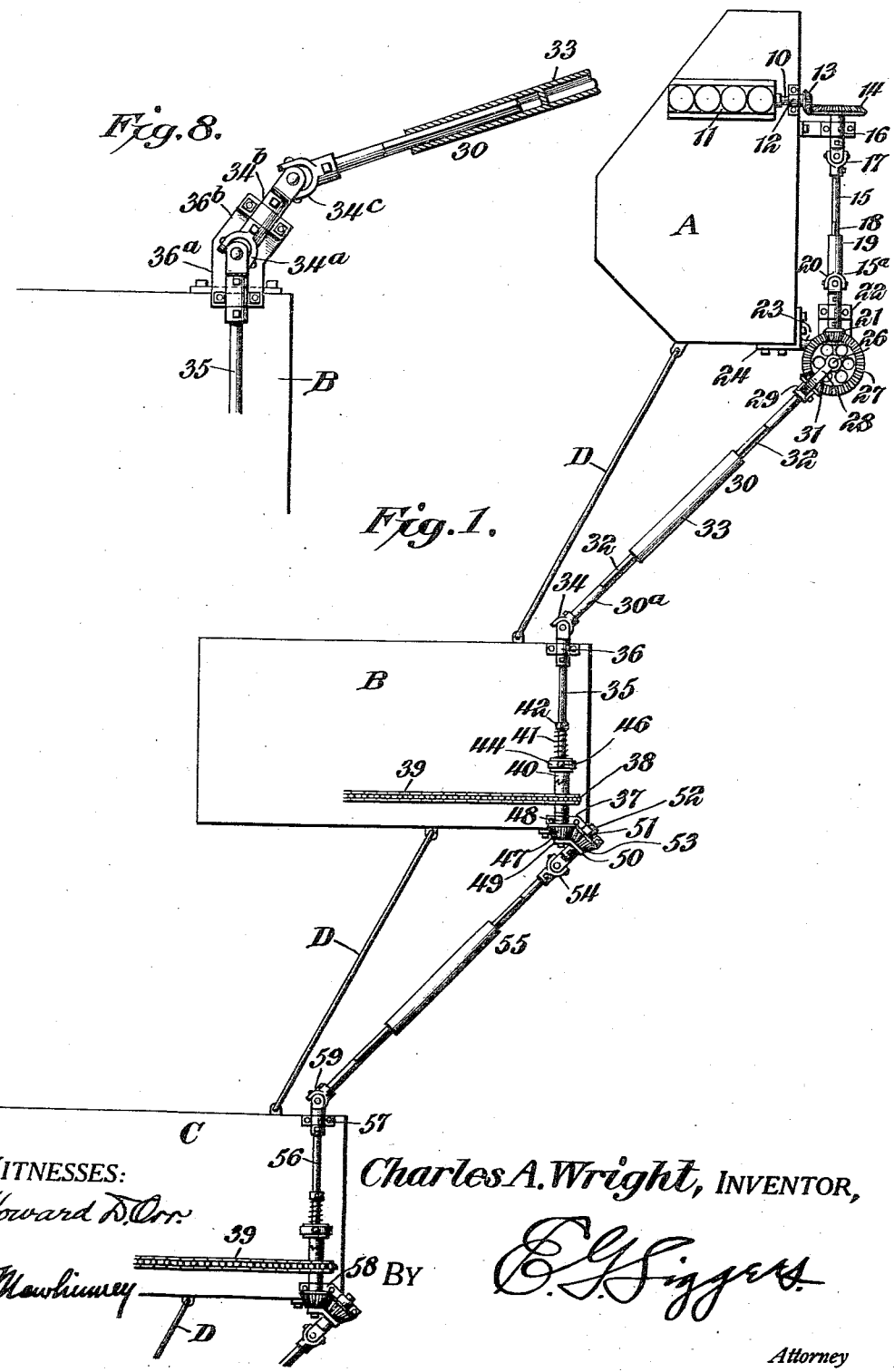

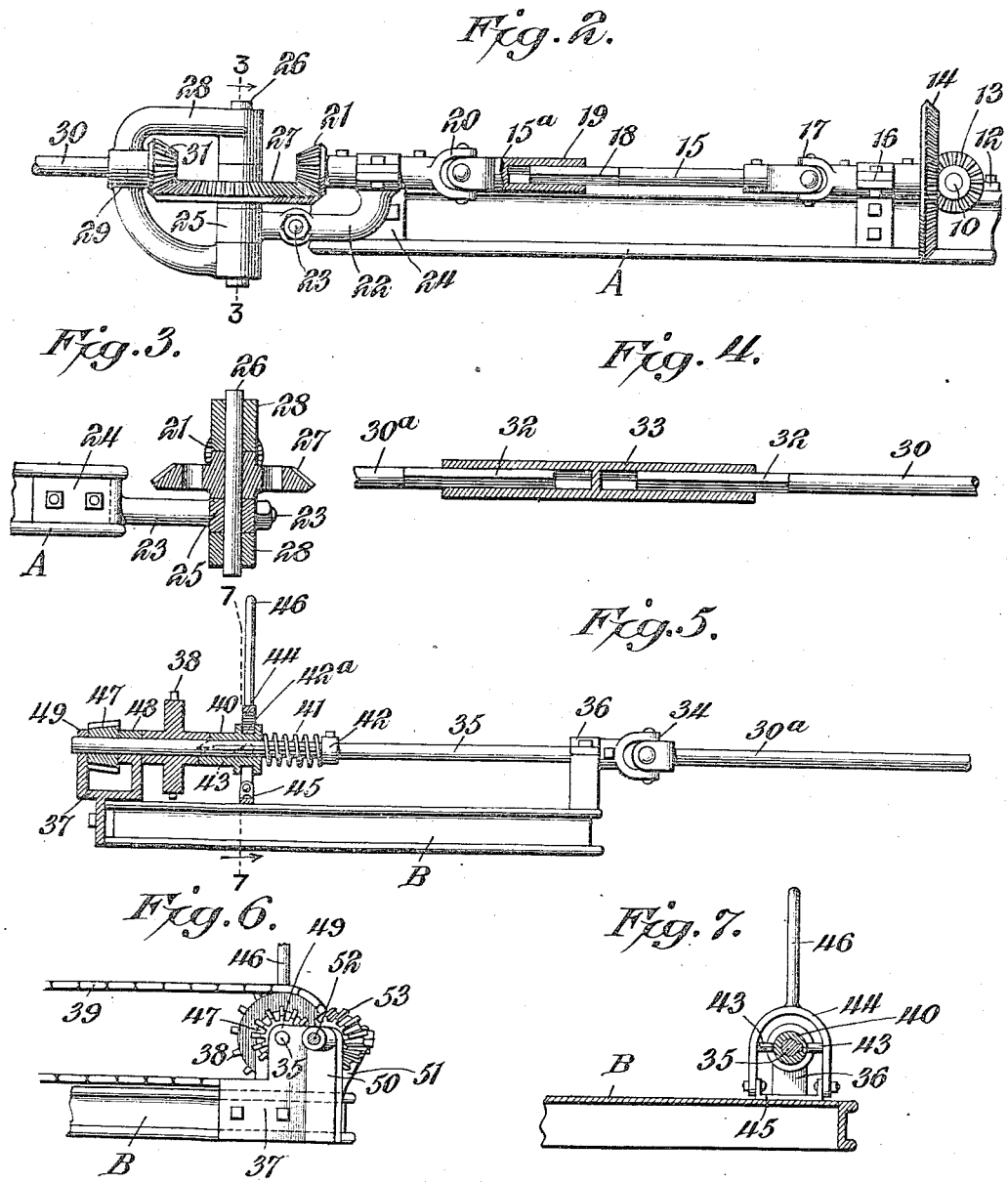

UNITED STATES PATENT OFFICE.

CHARLES A. WRIGHT, OF RINGWOOD, OKLAHOMA.

POWER-TRANSMITTING MECHANISM FOR TRACTORS.

1,245,168.  Specification of Letters Patent.  Patented Nov. 6, 1917.

Application filed November 19, 1915. Serial No. 62,392.

*To all whom it may concern:*

Be it known that I, CHARLES A. WRIGHT, a citizen of the United States, residing at Ringwood, in the county of Major and State of Oklahoma, have invented a new and useful Power-Transmitting Mechanism for Tractors, of which the following is a specification.

The present invention relates to an improved means for transmitting power from a tractor to any desired number of machines, of the same or various types, which are drawn by the tractor, and it is an object of this invention to provide such a power transmitting mechanism as will be automatically adjustable to varying conditions in the line of draft, and to various types of machines which are connected to either side of the tractor.

Another object of this invention is to provide a power transmitting mechanism of this type which is provided with certain parts adapting the mechanism to tractors of the three or four wheeled type, or of any other type, from which at the present time it is practically impossible to extend a power transmitting mechanism from the tractor motor to the machines which are operated by the tractor, unless the tractor is located either in direct alinement, or in some predetermined position to admit of the application of a belt or other like driving device incapable of adjustment.

It is a further object of this invention to provide a power transmitting mechanism for tractors wherein the various machines may be operated independently of the "bull wheel", or other friction means, depending upon contact with the ground over which the tractor is operated. Such a direct connection between the tractor and the machine reduces friction between the parts by considerably reducing the load on the drawbar, consequently admits of the operation of a larger number of machines, and provides for a steady positive operation of the machines drawn irrespective of the condition of the ground over which the same pass so that slipping of the "bull wheel" or the like, will in no wise affect the operation of the machine or increase the load on the drawbar.

A still further object of the present invention is to provide a power transmitting mechanism which is not only positive in its action, but which is also independent of the travel of the machine, and wherein the operation of the machine may be regulated to prevent choking of binders, or the like, when used, and which admits of the steady and uninterrupted operation of the machines when the same are not being drawn over the ground.

Various other advantages of this invention will be pointed out in the following detail descriptions of the present preferred embodiments, the same being shown in the accompanying drawings, wherein:—

Figure 1 is a plan view of a tractor and two machines coupled thereto, the tractor and machines being shown diagrammatically, and disclosing the power transmitting mechanism of this invention applied thereto.

Fig. 2 is a detail enlarged view partly in section, of the mechanism attached to the tractor.

Fig. 3 is a detail sectional view, taken on the line 3—3 of Fig. 2.

Fig. 4 is a detail sectional view of one of the extensible shafts, employed between the tractor and one of the machines drawn, and between the machines themselves.

Fig. 5 is a detail enlarged view partly in section of the transmitting mechanism mounted on the machines which are drawn.

Fig. 6 is a detail enlarged rear end elevation of the mechanism of Fig. 5, which is applied to one of the machines.

Fig. 7 is a transverse sectional view, taken on the line 7—7 of Fig. 5.

Fig. 8 is a plan view, partly in section, of a modified bracket, and angle coupling for use upon the machines.

Fig. 9 is a view similar to Fig. 1, but showing a slight modification of the arrangement of the parts.

Fig. 10 is a detail enlarged transverse sectional view, through the improved tilting and swinging power transmission jack.

Referring to these drawings, wherein like parts are designated by similar characters of reference throughout the several views, and referring particularly to Fig. 1, A designates diagrammatically a tractor, and B and C, two machines which are coupled to the tractor A by draft bars D. The tractor A may be of any type suitable for the work desired in drawing the machines B and C. The machines B and C may be binders, threshers, or any other type of machine which is adapted to be drawn by a tractor, and which has mechanism to be operated.

The mechanism of the present invention is applied to the tractor A and machines B and C, and as shown particularly in Figs. 1, 2 and 3, comprises a main shaft 10, which may be a clutch shaft of a motor 11, preferably the motor which propels the tractor or any other suitable type of shaft, adapted to deliver power for driving the various machines used. The shaft 10 projects laterally from the tractor A and is mounted near its outer end in a bearing 12. A beveled pinion 13 is carried on the shaft 10, and meshes with a beveled gear 14. The gear 14 is fixed to the inner end of an adjustable and extensible driving shaft 15 which is mounted on the tractor and is journaled at its inner end to a fixed bracket 16 projecting laterally from the tractor. The shaft 15 is made up of a pair of sections 15 and 15$^a$. The inner section 15 is journaled in the bearing 16 and has a universal joint 17 therein admitting of the lateral vibration of the shaft and of its swinging in various directions during adjustment, as will hereinafter appear. The outer end of the section 15 has an angularly faced shank 18 adapted to fit into a correspondingly formed socket 19 for sliding movement therein to thus admit of the longitudinal adjustment of the shaft 15. The section 15$^a$ is provided, between its outer end and the socket 19, with a universal joint 20, and has on its outer end a beveled pinion 21. The outer section 15$^a$ is journaled in an arm 22 which is pivotally mounted on a pin 23 projecting from a corner bracket 24 secured to the tractor A. The arm 22 is pivoted in a horizontal plane and is adapted to swing vertically about the pivot 23 so as to raise or lower the outer end of the shaft 15, the squared shank 18 and socket 19, as well as the universal joints 17 and 20, admitting of the free movement of the arm 22, and the transmitting of power through the shaft 15 at any adjustment of the arm 22. The outer end of the arm 22 is provided with a vertical bearing 25 therein, through which passes a vertical spindle 26. The spindle 26 carries thereon a relatively large beveled gear wheel 27 which meshes with the beveled pinion 21, and is driven thereby. A yoke 28 has its ends journaled upon the upper and lower extremities of the spindle 26 and has at its intermediate portion a horizontal bearing 29 receiving the inner end of an extensible transmitting shaft 30. The shaft 30 is provided with a beveled pinion 31 upon its end, and within the yoke 28, adapted to mesh with the beveled gear 27 and receive motion therefrom. The yoke 28 swings about the spindle 26 and holds the pinion 21 in engagement with the gear 27 at all times, and in such position as to receive power from the shaft 15 in any angular adjustment of the extensible shaft 30 with respect to the tractor.

The extensible transmitting shaft 30, as may be best seen from Fig. 4, comprises the end portions 30 and 30$^a$ having the angularly faced shanks 32 upon their inner adjacent ends for sliding engagement in the opposite ends of a socket or connecting sleeve 33, the opposite ends of which have openings which correspond in cross section to the angular formation of the shanks 32. With this construction, the sections 30 and 30$^a$ each have a sliding engagement with the connecting sleeve 33, so that the longitudinal adjustment of the shaft is assured even though one of the shanks 32 bind in its adjacent end of the sleeve 33 by the torsional strain upon the shaft. As shown in Fig. 1, the outer section 30$^a$ of the transmitting shaft is connected by a universal joint 34 with a machine shaft 35, the latter being journaled at its opposite ends in bearings 36 and 37, and extending from front to rear of the machine, preferably at one side thereof. Upon the shaft 35 is freely mounted a driving member, such as a sprocket wheel 38, receiving thereover a chain 39 leading to the operative parts of the machine B. A clutch sleeve or member 40, as may be best seen from Fig. 5, is keyed for longitudinal sliding movement upon the shaft 35, and is normally and yieldingly held in engagement with the driving member 38 by a spring 41. The spring 41 surrounds the shaft 35, bears at one end against the clutch member 40 and is yieldingly held thereagainst by an adjustable collar 42 carried on the shaft 35 and which bears against the outer end of the spring 41. The clutch member 40 is provided with a peripheral groove 42$^a$ to receive the inwardly extending pins 43 of a yoke 44, which yoke is arranged about the clutch member 40 and pivoted at its lower end to a foot piece 45 mounted on the machine B. The yoke 44 carries a handle 46, adapted to be grasped by the operator on the machine B, for throwing the mechanism of the machine out of operation by retracting the clutch member 40 from the driving member 38. When the clutch member 40 is retracted, the shaft 35 is free to turn within the driving member 38 without actuating the mechanism of the machine B.

The rear end of the shaft 35, which is journaled in the bracket or bearing 37, carries a beveled pinion 47 arranged upon the shaft 35 between the inner arm 48 and the outer arm 49 of the bracket 37. The arm 49 is preferably flattened, as shown to advantage in Figs. 1 and 6, and extends outwardly and rearwardly from the machine B at an obtuse angle, to provide a flange 50 upon the bracket 37. The inner arm 48 is likewise provided with an outwardly and rearwardly extending portion spaced from the flange 50 and lying substantially in parallelism therewith, and providing a rear flange 51. The flanges 50 and 51 constitute bearings for the reception of a stub shaft 52 upon which is fixed a beveled pinion 53, meshing with the pinion 47 which is mounted in the same bracket 37. It will be noted from Figs. 1 and 6 that the stub shaft 52, with its pinion, is arranged at such an angle to the machine shaft 35, and its pinion 47, as to project the stub shaft 52 inwardly and rearwardly from the machine B, such an arrangement and construction providing for a direct drive from the machine B to the machine C. The stub shaft 52 is provided upon its rear end with a universal joint 54 to which is secured a second extensible transmitting shaft 55. The shaft 55, arranged between the machines B and C, is of the same construction as that of the shaft 30 above described, and serves to transmit motion from the machine shaft 35 to the machine shaft 56 carried upon the machine C. The machine C is provided with bearings 57 and 58, which are in longitudinal alinement at the forward and rear portions of the machine, and which support the shaft 56 across the same. The forward end of the shaft 56 is connected to the rear end of the extensible shaft 55 by means of a universal joint 59, which admits of the various vertical and horizontal movements of the machine C with respect to the machine B.

In Fig. 8 there is shown a slight modification of a universal connection which may be used where the operative angle of the shafts 30 and 35 is relatively great, and where the strain on the connection is not very great. This modified form of connection, shown in Fig. 8, is adapted to be substituted for the universal joints 34 and 59 above referred to. In Fig. 8 the machine B is disclosed with its shaft 35 having the universal joint 34ª upon its forward end connecting the machine shaft to a stub shaft 34ᵇ, which is connected, by a second universal joint 34ᶜ, to the rear end of the extensible transmitting shaft 30. The stub shaft 34ᵇ is journaled in an angular extension 36ᵇ of the bracket or bearing 36ª, the latter being secured to the forward part of the machine B. It is, of course, understood that a like structure may be applied to the machine C for transmitting motion between the extensible shaft 55 and the machine shaft 56. The machine shaft 56 is of the same construction, and carries the same parts as above described in connection with the machine shaft 35 carried on machine B. It is, of course, understood that any number of machines may be connected by draw bars D, within reasonable limits, and that the mechanism of all of the machines may be driven from the motor 11 of the tractor A through the power transmitting mechanism of this invention, and that mechanisms of all of the machines may be independently thrown out of operation by the operation of the clutch handles 46 of the respective machines.

In the operation of the device, the tractor A moves forwardly in the usual manner, and draws after it the machines B and C. The motor 11, which may be the driving element for the tractor A, operates the power shaft 10, and through the gears 13 and 14 rotates the adjustable and extensible driving shaft 15. The shaft 15 drives the pinion 21, gear 27 and pinion 31 of the universal bracket carried upon the tractor A, and transmits the motion of the shaft 15 to the extensible transmitting shaft 30. The extensible shaft 30 transmits its motion to the machine shaft 35, and by reason of the connecting sleeve or socket 33 admits of the swaying and the adjustment of the machine B laterally with respect to the tractor A, the shanks 32 sliding in the sleeve 33 to increase or decrease the length of the shaft 30, as is found necessary during the relative lateral movement of the tractor A and machine B. The yoke 28 swings about the spindle 26 during this lateral movement of the machine B, so as to place little or no lateral strain upon the shaft 30. As the bracket arm 22 is free to swing about the pivot 23 the tractor is permitted to rise and fall with respect to the machine B, such action causing the bracket arm 22 to swing upon the pivot or pin 23, and raise or lower the outer end of the shaft 15. This relative movement of the outer end of the shaft is permitted, owing to the provision of the shank 18 and socket 19 in the shaft, and also by the provision of the universal joints 17 and 20.

Normally, the spring 41 interlocks the clutch member 40 with the driving element 38 and thus actuates the chain 39 to drive the mechanism of machine B. If it is desired to stop the mechanism of machine B, the operator grasps the clutch lever 46, and swings the same away from the driving element 38 so as to disconnect the clutch member 40 therefrom. Whether or not the clutch member 40 is in engagement with the driving member 38, the shaft 35 continues rotation and drives the intermeshing beveled pinions 47 and 53 in the angular bracket 37. By this means the stub shaft 52 is rotated and through the universal joint 54 turns the second extensible transmitting shaft 55. The shaft 55 transmits its motion through the universal joint 59 to the shaft 56 of the machine C, and, by means of the mechanisms above described in connection with machine B, actuates the chain 39 of the machine C, and drives the mechanism thereof.

It is, of course, understood that as many extensible shafts 30 and 55 as is desired may be used, and also that the machines B and C may be arranged at different sides or angles with respect to the tractor A, than those disclosed in the present drawings. The universal bracket carried upon the rear end of the tractor not only permits the swinging of the outer free end of the shaft 30 in a vertical plane, but it also enables the coupling of the shaft 30 to the machine B when disposed at the opposite side of the tractor A instead of at the left side thereof, as is shown in Fig. 1 of the drawings. This universal bracket, therefore, serves as a universal connector for the shaft 30 when extending at practically any angle rearwardly from the tractor A, and at the same time admits of the free vibration of the shaft 30 in any direction.

In Figs. 9 and 10 of the drawings, there is shown a slight modification in the arrangement of the parts, and wherein the tractor E draws the binders F and G, or any other suitable machines, by means of the draw-bars H. The tractor E is provided with a motor 60 of any approved type, and arranged in any desired manner, although shown in the present instance as extending transversely across the forward end of the tractor, having its crank or clutch shaft 61 projecting laterally from the tractor, and carrying a pulley 62, upon the outer end of the shaft 61. A belt 63 is passed over the pulley 62 and extends rearwardly along the side of the tractor E to the rear end thereof, and is there engaged over a second pulley 64 carried upon an operating or drive shaft 65. The drive shaft 65, as may be best seen from Fig. 10, extends inwardly and transversely of the tractor E, and is mounted in a bracket bearing 66. A swinging or tilting arm 67 of substantially U-shape, has one end thereof in the form of a bearing 68, mounted for rotation upon the inner end of the shaft 65, while the opposite end of the swinging arm 67 is provided with a horizontal pin 69, projecting through an opposed bracket 70 carried by the tractor in transverse alinement with the bracket 66. A stop collar 71 is detachably secured upon the outer end of the pin 69, and engages the outer side of the bracket 70, to hold the pin in proper position. Thus, the intermediate portion of the shaft 65, and the pin 69 constitute horizontal supports or bearing pins for the swinging bracket arm 67. A spindle 72 rises from the intermediate portion of the bracket arm 67, carries a large spur gear 73 immediately above the bracket 67, and carries upon its opposite ends the arms of a fork or yoke 74, which projects rearwardly from the spindle 72. The inner end of the shaft 65 projects through the bearing 68, and carries against the inner side of the bearing a spur pinion 75, meshing with the gear 73. As in the preferred form, a longitudinal extensible shaft 76 has one end journaled in the yoke or fork 74 and is provided with a pinion 77 lying within the yoke 74, and meshing with the gear 73. By this arrangement, the drive shaft 65 rotates the gear 73, which in turn rotates the pinion 77, and thus turns the longitudinally extensible transmission shaft 76. It will also be seen that this transmission shaft 76 may be swung to either side of the tractor E, so as to accommodate the machines F and G, whether placed at the left hand side of the tractor E, or arranged oppositely, or in any other desired and necessary position, for carrying on the work. This jack, which is mounted on the rear end of the tractor is, like the jack shown in Fig. 1 of the drawings, capable of tilting in a vertical plane to admit of the vertical movement of the machines relatively to the tractor, and is also capable of swinging laterally, to take care of any lateral displacement in the line of draft.

The rear end of the transmission shaft 76 is provided with a universal joint 78, admitting of the various lateral and vertical adjustments of the shaft, to take up the inequalities in the line of draft, and is connected at its rear end to an angle jack 79, which is of the same form or structure, as disclosed in Fig. 1, at the rear sides of the machines B and C.

These angle jacks 79 are adapted to be used particularly where the angle between the extensible transmission shaft 76, and the machine shaft 80 is substantially beyond the limit of a universal joint, the angle jack throwing the axis of the universal joint 78 substantially in longitudinal alinement with the transmission shaft 76. Thus, a practically straight line drive is provided between the tractor and the machines, and between the machines themselves. It is to be understood that the gears 81 and 82 may be retained at any desired angle with respect to each other, and may be accordingly beveled, to dispose the same at the desired angle to coincide the axis of the universal joint with the axis of the adjacent transmission shaft. It will be noted that in Fig. 9, the rear end of the machine shaft 80 is provided with a second angle jack 83, which is of substantially the same form as the jack 79, the only difference being that the gears 84 and 85 thereof are disposed at an increased angle to each other, as the second transmission shaft 86 extends at a greater angle to the line of draft than does the transmission shaft 76. The machine G is likewise provided with an angle jack 87 upon its forward end, connected to the machine shaft 80, and is provided with another angle jack 88 at its rear end to transmit power from the shaft 80 to any desired number of machines which may follow.

It is to be understood that the angle jack of Fig. 8 may be substituted in lieu of these jacks 79, 83, 87, and 88, and that any other desired combination or arrangement of the jacks and the universal joints herein shown in the several figures, may be resorted to, within the spirit of this invention to better accommodate the devices to the line of draft and positions of machines which will necessarily be changed for different kinds of work.

Instead of the sprocket and chain drive, indicated at 38 and 39 in Fig. 1 of the drawings, it is to be understood that any desired mechanism or devices may be employed for taking power from the machine shaft to the mechanism of the machine. In Fig. 9 another form of power transmitting mechanism is shown for each machine, wherein a loose sleeve 89 is mounted on the power shaft 80, and interlocked thereto, by a clutch member 90. The sleeve 89 carries a beveled gear 91, the latter meshing with a second beveled gear 92, fixed upon a shaft 93 extending transversely of the machine, although the shaft may be projected at any angle or in any direction toward the point at which the power is to be applied. The shaft 93 is mounted in a bracket 94 rising from the frame of the machine. The machines F and G are both shown as equipped with this modified arrangement of mechanism, although it is to be understood that they may be inter-changed with the mechanism shown in Fig. 1, in any desired combination.

In both of the above set forth forms of this invention, the usual tractor may be employed, and the power shaft may be extended from the usual tractor motor which propels the tractor. The tractor motor may thus drive the tractor wheels, and at the same time drive the mechanisms of the different machines, or may drive the same independently of each other. Likewise the mechanisms of the different machines may be operated all at the same time, or one or more independently of the remaining mechanisms. The draw-bar load on the tractor is thus reduced to the draft of the several machines, and does not include the usual additional load caused by the resistance of the bull wheels in operating the various mechanisms of the machines being drawn.

It is, of course, understood that various modifications or changes may be made in the minor details of the device, without departing from the spirit of the invention, such changes or modifications being restricted only by the scope of the following claims.

What is claimed is:—

1. The combination with a tractor and a series of machines drawn thereby, of means for transmitting power from the tractor to the series of machines with the latter arranged in echelon, comprising shafts extended along like ends of and individual to the tractor and each machine of the series, and extensible and contractile coupling shafts between the first-named shafts, said coupling shafts having universal-joint connections at one end and connections including angle gearing at the other end with respective ones of the first-named shafts.

2. The combination with a tractor and a series of machines drawn thereby, of means for transmitting power from the tractor to the series of machines with the latter arranged in echelon, comprising shafts extended along the like ends of and individual to the machines of the series, and extensible and contractile coupling shafts between the tractor and the shaft of the first of the series of machines and also between the shafts of the machines of the series, said coupling shafts having universal-joint connections at one end and connections including angle gearing at the other end with respective ones of the first-named shafts and also with the power means on the tractor.

3. The combination with a tractor and a series of machines drawn thereby, of means for transmitting power from the tractor to the series of machines with the latter arranged in echelon, comprising shafts extended along the like ends of and individual to the machines of the series, and extensible and contractile coupling shafts between the tractor and the shaft of the first of the series of machines and also between the shafts of the machines of the series, said coupling shafts having universal-joint connections at one end and connections including angle gearing at the other end with respective ones of the first-named shafts and also with the power means on the tractor, a clutch on each of the shafts of the machines of the series, and means for transmitting power through the clutch to mechanism upon a respective machine.

4. The combination with a tractor and a series of machines drawn thereby, of means for transmitting power from the tractor to the series of machines with the latter arranged in echelon, comprising shafts extending along like ends of the machines of the series and in substantial parallelism with the direction of travel of the machines, and extensible and contractile coupling shafts between the first-named shafts and also between the first of the series of machines and the tractor, said coupling shafts being arranged at an angle to the line of draft and having universal-joint connections at one end and connections including angle gearing at the other end with respective ones of the first-named shafts and with the power means of the tractor.

5. The combination with a tractor and a series of machines drawn thereby, of means for transmitting power from the tractor to the series of machines with the latter arranged in echelon, comprising shafts extending along the like ends of and individual to the machines of the series, with said shafts in substantial parallelism with each other and with the line of travel of the series of machines, and extensible and contractile coupling shafts between the first-named shafts and between the foremost machine of the series and the tractor with the coupling shafts arranged in substantial parallelism and at an angle to the line of travel, said coupling shafts each having a universal-joint connection at the rear end and a connection including angle gearing at the forward end with respective ones of the first-named shafts and with the tractor.

6. The combination with a tractor and a series of machines drawn thereby, of means for transmitting power from the tractor to the series of machines with the latter arranged in echelon, comprising shafts extending along the like ends of and individual to the machines of the series with said shafts in substantial parallelism with each other and with the line of travel of the series of machines, and extensible and contractile coupling shafts between the first-named shafts and between the foremost machine of the series and the tractor with the coupling shafts arranged in substantial parallelism and at an angle to the line of travel, said coupling shafts each having a universal-joint connection at the rear end and a connection including angle gearing at the forward end with respective ones of the first-named shafts and with the tractor, a clutch connection on each of the shafts of the machines of the series, and connections controlled by the clutch for driving machinery upon the respective machine.

7. The combination with a tractor and a series of machines drawn thereby, of means for transmitting power from the tractor to the series of machines with the latter arranged in echelon, comprising a sectional flexible line of shafting extending from the tractor through the entire series of machines and receiving power from the tractor, and connections from the shafting and individual to each machine for independently connecting mechanisms on the machines to respective sections of the flexible line of shafting.

8. In combination with a tractor, and a plurality of machines connected thereto to be drawn by the tractor, of a driving shaft on each of the machines, a universal connection at the forward end of each of the driving shafts, an angle bracket supporting the rear end of each of the driving shafts, a stub shaft in each angle bracket geared to the adjacent driving shaft and extending rearwardly at an angle thereto, a power transmitting shaft on the tractor, a universal bracket on the tractor having connection with the power transmitting shaft, and extensible shafts mounted between the universal bracket on the tractor and the universal connection of the adjacent machine, and between the stub shafts and the universal connections of the remaining machines.

9. The combination with a tractor and a series of machines drawn thereby, of means for transmitting power from the tractor to the series of machines with the latter arranged in echelon, comprising shafts extending along the like ends of and individual to the machines of the series and each mounted in constant relation to the respective machine and provided with gearing in fixed angular relation to the shaft at the end of the latter constituting the rear end in the direction of travel of the machines, and extensible and contractile coupling shafts between and connecting the shafts individual to the machines, said coupling shafts including universal joints near the ends connected to the shafts of the machines.

10. In combination with a tractor, and a plurality of machines connected to the tractor to be drawn thereby, a shaft on the tractor and on each machine, operating means on the tractor for turning the shaft thereon, a transmitting shaft arranged between the tractor and the first machine and other transmitting shafts between the remaining machines, and gears carried by the tractor and the machines between the shafts thereon, and transmitting shafts for connecting the same together, said gears being arranged with their axes at angles to one another to transmit power through the transmitting shafts directly from the gears and admit of the extension of the transmitting shafts rearwardly and obliquely from the tractor and the machines substantially parallel to the line of draft.

11. The combination with a tractor and a series of machines drawn thereby, of means for transmitting power from the tractor to the series of machines with the latter arranged in echelon, comprising an angular line of shafting extending from the tractor to the forward one of the series of machines, and along each machine and between such machine and the next in order, with the portion of the line of shafting extending between the machines arranged at an angle to the line of travel, and adjustable connections in the line of shafting between the machines admitting of the lateral and vertical play of the machines with respect to each other and the lateral adjustment of the machines behind the tractor.

12. In combination with a tractor, and a machine connected to the tractor to be drawn thereby, a power shaft on the tractor, a flexible and longitudinally extensible shaft mounted on the tractor, gears between the power shaft and said flexible shaft for driving the latter, a bracket on the tractor, a horizontal pin projecting from the bracket, an arm pivoted on the pin adapted to swing in a vertical plane and constituting a bearing for the outer end of said flexible shaft, a vertical spindle carried by said pivot arm, a yoke mounted on the ends of the spindle and adapted to swing thereabout in a horizontal plane, a gear on the spindle, a pinion on the adjacent end of said flexible shaft meshing with said gear, a transmitting shaft journaled at one end in said yoke, a pinion on the inner end of the transmission shaft meshing with said gear, said pivoted arm and said yoke being adapted to swing about the pin and the spindle respectively to accommodate the shafting to lateral and vertical movements relatively to the tractor and the machine, the flexible and longitudinally extensible shaft being adapted to automatically adjust itself to the movements of said pivoted arm.

13. In combination with a tractor and a machine drawn thereby, a power shaft on the tractor, a driving shaft on the tractor geared to said power shaft, a vertically movable bearing for the outer end of the driving shaft, a slidable connection in the driving shaft to admit of the elongation of the same upon the swinging of the bearing, universal joints in the driving shaft to admit of the flexing thereof incident to the swinging of said bearing, and a transmitting shaft between the tractor and the machine having its inner end supported on the bearing and intergeared with said driving shaft.

14. The combination with a tractor and a series of machines drawn thereby, of means for transmitting power from the tractor to the series of machines with the latter arranged in echelon, comprising angle gearing on the tractor, flexible connections between the power unit of the tractor and the angle gearing, shafting on each machine in constant relation to the machine and extending along one end thereof, an extensible and contractible shaft extending from the angle gearing on the tractor to the shaft of the first machine in order and provided with universal joint connections with the angle gearing and shaft on the first machine, respectively, angle gearing at what constitutes the rear end of the shaft on each machine, and extensible and contractible shafting connecting the angle gearing on each machine to the shaft of the next machine in order, said extensible and contractible shaft having universal connections at the ends with the parts to which it is joined.

15. The combination with a tractor and a series of machines drawn thereby, of means for transmitting power from the tractor to the series of machines with the latter arranged in echelon, comprising angle gearing on the tractor, flexible connections between the power unit of the tractor and the angle gearing, shafting on each machine in constant relation to the machine and extending along one end thereof, an extensible and contractible shaft extending from the angle gearing on the tractor to the shaft of the first machine in order and provided with universal joint connections with the angle gearing and shaft on the first machine, respectively, angle gearing at what constitutes the rear end of the shaft on each machine, and extensible and contractible shafting connecting the angle gearing on each machine to the shaft of the next machine in order, said extensible and contractible shaft having universal connections at the ends with the parts to which it is joined, and a clutch connection on each of the shafts of the machines of the series for coupling the shaft to and uncoupling it from machinery on the respective machine.

In testimony, that I claim the foregoing as my own, I have hereto affixed my signature in the presence of two witnesses.

CHARLES A. WRIGHT.

Witnesses:
W. E. MANSUR,
C. I. GORDON.